No. 27,940.
F. P. WENDELL.
JOURNAL BOX.
PATENTED APR. 17, 1860.
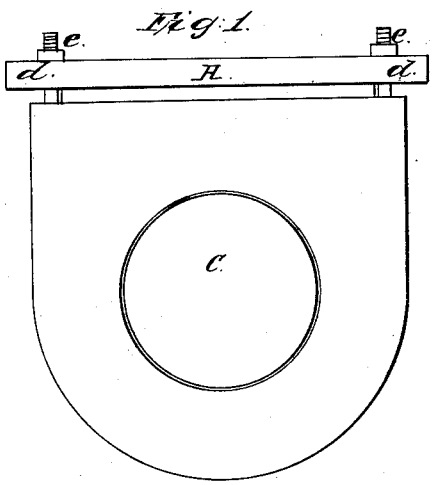
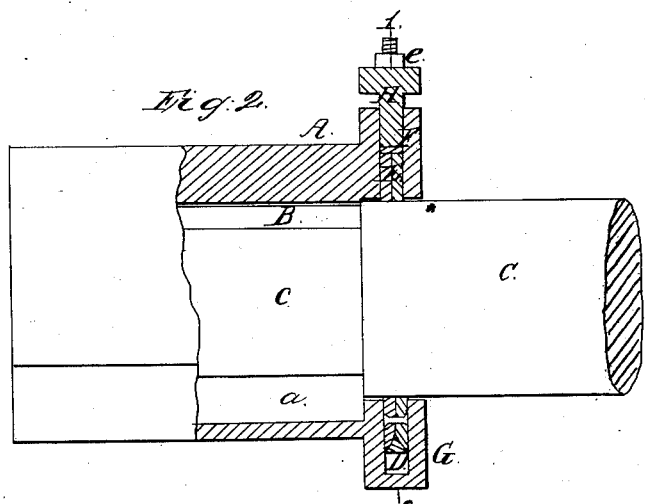
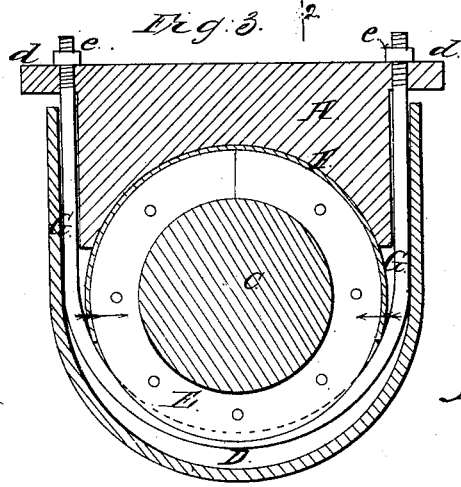
Witnesses:
Henry Howden
Horace See
Inventor:
Isaac P. Wendell

UNITED STATES PATENT OFFICE.

ISAAC P. WENDELL, OF PHILADELPHIA, PENNSYLVANIA.

JOURNAL-BOX.

Specification of Letters Patent No. 27,940, dated April 17, 1860.

*To all whom it may concern:*

Be it known that I, ISAAC P. WENDELL, of the city of Philadelphia, State of Pennsylvania, have invented certain new and useful Improvements in Journal-Boxes; and I do hereby declare the following to be a full, clear, and exact description of the same, reference being had to the accompanying drawing and to the letters of reference marked thereon.

My invention relates to improvements in journal boxes which are furnished at one or both ends with a chamber containing packing to prevent the lubricating material from escaping from the oil chamber of the box, and my improvements consist in the employment of a double washer, forming the packing, a wedge formed strap bolt, a follower, and a bent strip, the whole being arranged within the packing chamber of a journal box, substantially in the manner described hereafter, so that by the simple turning of the nuts of the said strap bolt, the packing may be tightened within its chamber and against the axle thereby more effectually preventing the escape of oil from the box than the packing appliances heretofore used.

In order to enable others to make and use my invention I will now proceed to describe its construction and operation.

On reference to the accompanying drawing which forms part of this specification Figure 1, is a rear end view of an axle box with my improvements; Fig. 2, a side view partially in section; Fig. 3, a transverse vertical section on the line 1, 2, Fig. 2.

Similar letters refer to similar parts throughout the several views.

The body A of the axle box has the usual oil chamber $a$ and is furnished with the step or steps B adapted to the journal $c$ of the axle C.

In the rear of the box is formed a chamber D having an opening large enough to admit the enlarged portion of the axle C which passes through the chamber as best observed on reference to Fig. 2.

Within the chamber and surrounding the enlarged portion of the axle, is the annular washer E of leather or other suitable material forming the packing to prevent the oil from escaping at the rear of the box.

Into the upper end of the chamber D is inserted the follower H the concave under side of which is adapted to the bent strip F, the latter being arranged to lap over the upper portion of the packing E.

Underneath the packing passes the bent portion of the strap bolt G the two ends of which pass upward, one end on one side and the other end on the opposite side of the follower H, and through lugs $d$ projecting from the follower above which lugs the ends of the bolts are furnished with suitable nuts $e\ e$, as seen in Fig. 3.

It will be observed on reference to Fig. 2, that the packing washer E is made of two pieces riveted or otherwise secured together and that the strap bolt G is of a wedge form its sharp edge penetrating between the two pieces which form the washer, as seen in dotted lines Fig. 3, so that on screwing the nuts $e\ e$ tight and thereby elevating the strap bolt, the latter acting as a wedge, will force apart the two halves of the washer at the lower end of the same, thereby forming a tight joint within the chamber at the point where the oil is most apt to escape from the box, at the same time the lower portion of the washer is elevated and presses against the axle, thereby increasing the tightness of the joint. Simultaneously with the raising of the strap bolt by the turning of the nuts $e\ e$, the follower H will be depressed, consequently forcing the upper portion of the washer against the axle.

It will be observed that the strap bolt near the junction of its bent with its straight portions, is in contact with the ends of the bent strip F, so that on depressing the follower and elevating the said strap bolt, the latter will force the bent strip in the direction of the arrows thereby forcing the packing against the opposite sides of the axle.

Without further description it will be evident that by simply turning the two nuts $e\ e$ a simultaneous tightening of the packing to the axle C in every direction as well as a pressure of the lower portion of the packing against the inside of the chamber will be produced, thereby preventing the escape of the oil from the oil chamber of the box.

I claim as my invention and desire to secure by Letters Patent—

1. The double washer E of leather or other suitable material the wedge formed strap bolt G and the follower H the whole being arranged within the chamber D of a journal box substantially in the manner and for the purpose herein set forth.

2. The follower H and the bent strip F in combination with the packing E and strap bolt G the whole being applied to the journal box in the manner and for the purpose specified.

In testimony whereof, I have signed my name to this specification, in the presence of two subscribing witnesses.

ISAAC P. WENDELL.

Witnesses:
 HENRY HOWSON,
 CHARLES D. FREEMAN.